April 7, 1964

C. C. ROE 3,127,791

POWER TRANSFER DEVICE

Filed Jan. 22, 1963

Inventor
CHARLES C. ROE

By Wolfe, Hubbard, Voit & Osann
Attorneys

April 7, 1964

C. C. ROE 3,127,791

POWER TRANSFER DEVICE

Filed Jan. 22, 1963

Inventor
CHARLES C. ROE
By Wolfe, Hubbard, Voit & Osann
Attorneys

United States Patent Office 3,127,791
Patented Apr. 7, 1964

3,127,791
POWER TRANSFER DEVICE
Charles C. Roe, Rockford, Ill., assignor to Warner Electric Brake & Clutch Company, South Beloit, Ill., a corporation of Delaware
Filed Jan. 22, 1963, Ser. No. 253,163
6 Claims. (Cl. 74—675)

The present invention relates to a power transfer device, and more particularly it is directed to an improved device adapted to transfer power alternately from a plurality of power sources to an output shaft.

The power transfer device of the present invention is in the nature of a differential wherein the one power source acts upon the output independently of the action of the other power source.

In the generally recognized construction of differentials a series of bevel gears may be included which are so arranged that one shaft of the assemblage may rotate independently of the rotation of another shaft. Interference between angular velocity and rotational energy applied between shafts is thus obviated. Some differentials employ hypoid gears, for example, or other relatively complex arrangements in lieu of the often used bevel gear assemblages. Differentials, or power transfer devices, of the type noted hereinabove usually include the bevel gear assemblage, or the like, within a housing which housing in turn is affixed to a larger gear. The entire differential, of course, is encased with a suitable capsule for protection of the gears and to facilitate lubrication of the entire mechanism. Modification of the gears of the differential to alter the output ratios and the rotational potential available to each shaft with such an assemblage is a major task.

The present invention contemplates the provision of an improved power transfer mechanism wherein only spur gears are employed in the differential-like portion of the device and wherein the gears may readily be modified to permit change of ratios thereby to increase the flexibility of the device.

It, accordingly, is a general object of the present invention to provide an improved power transfer device.

A further object of the present invention resides in the provision of an improved power transfer device utilizing spur gears.

Another object of the present invention is in the provision of an improved power transfer device employing spur gears wherein the gears may readily be changed to modify the power transfer ratios.

An additional object of the present invention resides in the provision of an improved power transfer device wherein the gear assemblage is readily accessible for repair of modification.

Another object of the present invention is in the provision of a power transfer device wherein power is alternately applied from a pair of power sources to power output means.

An additional object of the present invention resides in the provision of an improved power transfer device employing spur gearing wherein power is smoothly applied or alternated from one or the other of two power sources to power output means of the device without interference by one power source of the action of the other.

A further object of the present invention resides in the provision of an improved power transfer device that is economical to manufacture, readily assembled and easy to use.

The novel features which are believed to be characteristic of the invention are set forth with particularity in the appended claims. The invention itself, however, together with further objects and advantages thereof, will best be understood by reference to the following description taken in connection with the accompanying drawings, in which:

Figure 1:
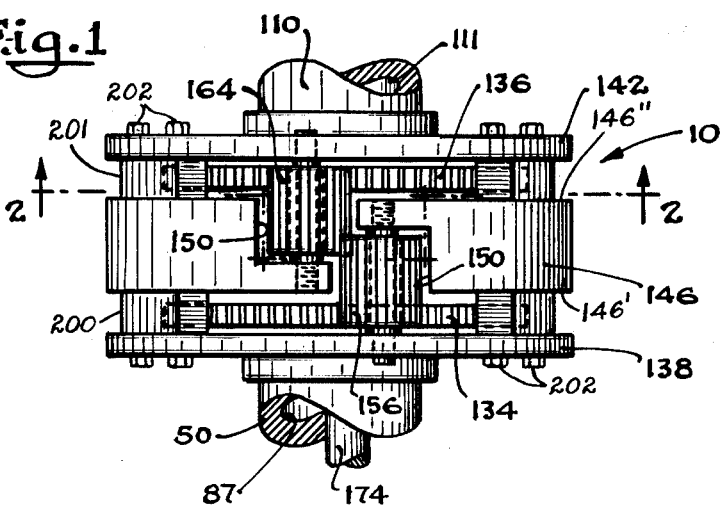
FIGURE 1 is a top plan view of the power transfer device of the present invention.

Referring to the drawings, the power transfer device, in assembly, is indicated generally at 10. A separate power input source (not shown) is operatively interconnected to each of the input drive shafts 12 and 14, respectively.

The input drive shaft 12 extends through a shaft receiving opening 16 defined in the housing wall 18. The shaft receiving opening 16 defines a recessed portion 20 therein which recess 20 is adapted to receive a seal 22.

The seal 22 is adapted to define a dust seal, or the like, between the recess 20 of the housing wall 18 and the outer periphery of the shaft 12 when the shaft is mounted therein.

The housing for the input power chain and the power transfer mechanism is defined by the housing wall 18 which may extend in a generally circumferential manner. The housing 18 of the assembly is defined in two separate sections 18a and 18b, respectively. The separate sections 18a and 18b of the housing 18 are interconnected in spaced apart relation at the central portion of the assembled device by sectioned plates 19. The sectioned plates 19 may be removed individually to provide convenient access to the power transfer device, described in detail hereinbelow.

Plates 24, 26, 28 and 30 are bolted to the housing wall 18 at spaced intervals therealong to define three separate chambers, end chambers 32 and 36 and central chamber 34.

Figure 3:
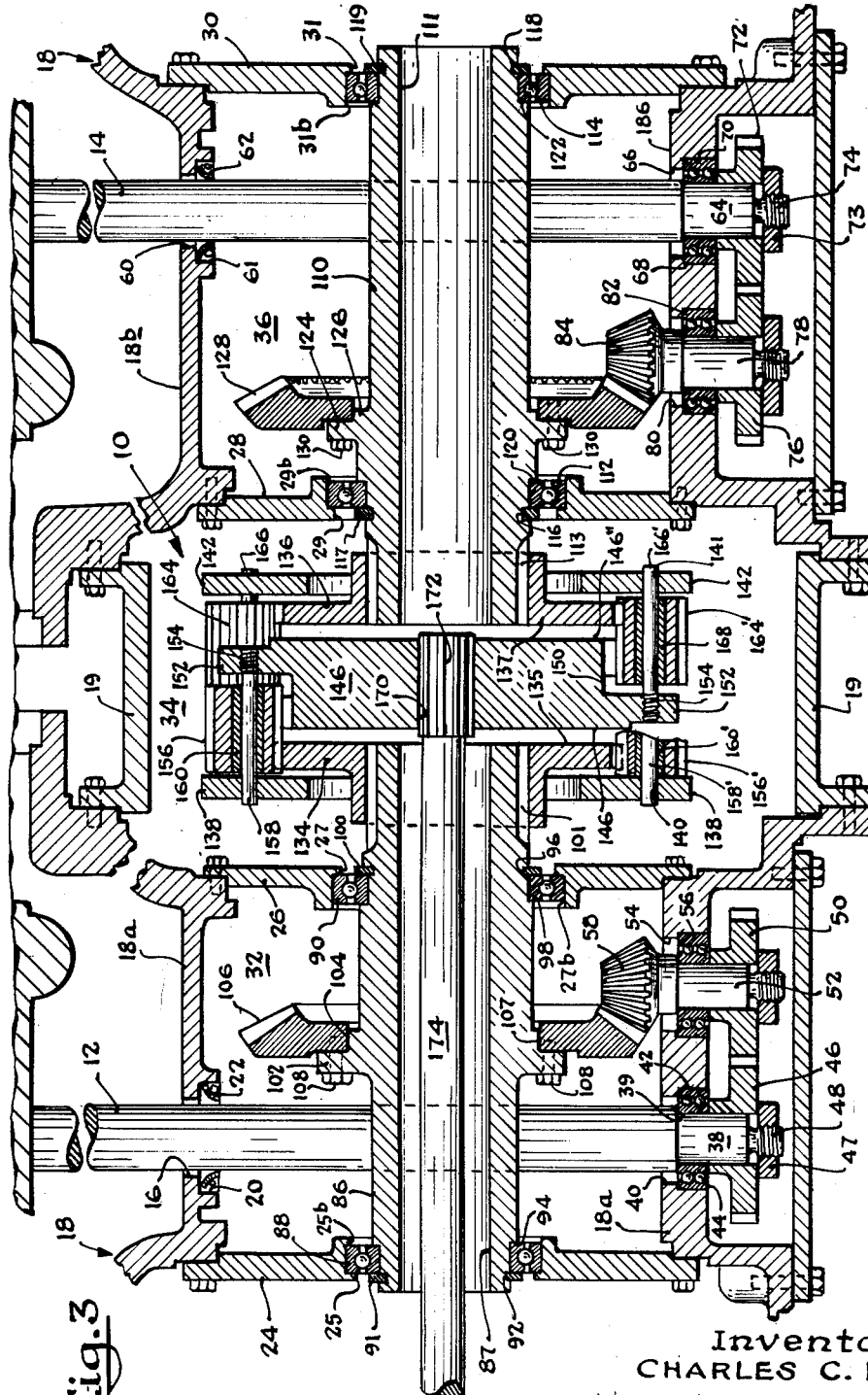
FIGURE 3 is a sectional view of the power transfer device of the present invention including, for purposes of illustration, the power input drive means.

The plate 24 is affixed to the housing wall section 18a at the left extreme position as shown in FIGURE 3 and defines an end cap for the housing chamber 32. A central opening 25 is defined in the plate 24. Plate 26 is affixed at the opposite extreme of the housing wall section 18a and defines a mutual wall between chambers 32 and 34, said plate having a central opening 27 extending therethrough. The plate 30 defines the end cap for the housing chamber 36, said plate being affixed to the right extreme of the housing wall section 18b as seen in FIGURE 3 of the drawings. Plate 30 is provided with a central opening 31 extending therein. The plate 28 is affixed at the opposite extreme position of wall section 18b and defines a mutual wall between chambers 34 and 36. The plate 28 defines a central opening 29 extending therethrough.

The inner terminal of the shaft 12 defines a decreased diameter portion 38, the juncture of the portion 38 and the main shaft portion 12 defining a shoulder 39. The inner terminal of the shaft 12 extends through an opening 40 defined in the housing wall 18a. The opening 40 further defines a recessed portion 42 which is adapted to receive a bearing member 44. The bearing 44 is longitudinally positioned on the shaft 12 against the shoulder 39 thereof, said bearing being adapted to rotatably support said shaft 12 within the opening 40 of the housing wall section.

A spur gear 46 is affixed to the free end of the inner terminal of the shaft 12 by a nut 47, which nut is threadably received upon the threaded portion 48 of shaft 12. A second spur gear 50 is mounted in interengaging relation to the spur gear 46, said gear 50 being supported on shaft 52. The shaft 52 is rotatably mounted within an opening 54 of the housing wall section 18a by a bearing member 56. The bearing 56 is supported within a recessed portion defined within the opening 54 of the wall section 18a.

A bevel pinion gear 58 is affixed to the opposite end of the shaft 52.

The input shaft 14 is interconnected in a power transfer chain in much the same fashion as that defined for shaft 12. The shaft 14 extends through an opening 60 defined through the wall section 18b of the housing 18. A recess 61 is defined within the opening 60 and is adapted to receive a dust seal, or the like, 62. The seal 62 occludes the space defined between the outer periphery of the shaft 14 and the outer diameter of the opening 60.

The inner terminal of the shaft 14 defines a decreased diameter portion 64 which portion extends into an opening 66 defined in the wall section 18b. Opening 66 defines a recessed portion 68 adapted to receive a bearing member 70. The bearing member 70 rotatably supports the inner terminal of the shaft 14 with respect to the housing wall section 18b adjacent the opening 66.

A spur gear 72 is affixed to the inner terminal of the shaft 12 by a nut 73, which nut is threadably received on the threaded portion 74 of the shaft 12. A spur gear 76 is disposed in meshing engagement with the gear 72. The gear 76 is supported by shaft 78, said shafts being rotatably mounted within opening 80 in wall 18b of the housing by the bearing member 82. A bevel pinion gear 84 is affixed to the other end of shaft 78. The outer race of each of the bearings 44, 56, 70 and 82 may be affixed within the recesses within which the bearings are disposed for positive retention of the bearings within the respective openings of the housing wall sections. Such retention means for bearings are known to the art and form no part of the invention set forth herein.

A hollow tube-like shaft 86 having a central opening 87 is rotatably supported within the central openings defined in the plates 24 and 26, respectively by bearing members 88 and 90, respectively. The bearing member 88 is disposed within a recess 25b defined in the central opening 25 of the plate 24. The bearing member 90 is disposed within recess 27b defined within the opening 27 of the plate member 26. A snap ring 91 disposed within a groove 92 in shaft 86 serves to define the outboard position limit of the bearing 88 upon the outer wall of the shaft 86. A shoulder 94 is provided along the outer surface of the shaft 86 in spaced relation to the groove 92 defined in the outer wall thereof to define the inboard position limit for the inner race of the bearing member 88 said bearing being longitudinally positioned on said shaft 86 between said snap ring 91 and said shoulder 94.

The shaft 86 extends from the plate 24, through chamber 32 of the housing 18, through the opening 27 in plate 26 and into the chamber 34 of said housing. The shaft 86 defines a groove 96 along the outer wall thereof in the area adjacent the central opening 27. A shoulder 98 is defined on the outer shaft wall in spaced relation to the groove 96. The bearing member 90 is longitudinally positioned on the outer shaft wall between the shoulder 98 and the groove 96. A snap ring 100 is adapted to be received within the groove 96 to thereby rigidly longitudinally affix the bearing member 90 along the outer shaft wall. The inner rate of each of the bearings, of course is in engagement with the outer shaft wall. The outer races of bearings 88 and 90 are in engagement with the recesses 25b and 27b, respectively, of central openings 25 and 27. The portion of the shaft 86 extending into the chamber 34 of the housing defines a splined portion 101 thereon.

The shaft 86 has a radially projecting flange portion 102 in the central longitudinal area thereof. A raised shoulder portion 104 is defined along the outer shaft wall. A bevel gear 106 having a central opening 107 is adapted to be slidably received upon the shoulder portion 104, the opening 107 being snugly received by said shoulder.

The gear 106 is rigidly non-rotatably affixed with respect to the shaft 86 by a plurality of bolts 108, which bolts extend through the flange 102 and to the gear 106. The bevel gear 106, when mounted on the shaft 86, is in interengaging relation with the bevel pinion 58.

A second hollow tube-like shaft 110 having a central longitudinally extending opening 111 is rotatably supported within the central openings 29 and 31 of the plates 28 and 30, respectively, by bearing members 112 and 114, respectively. Bearing 112 is disposed in a slightly enlarged recess 29b of opening 29 and bearing 114 is recessed in recess 31b of opening 31.

The shaft 110 defines a pair of grooves 116 and 118 in the outer wall thereof, the groove 116 being adjacent the central opening 29 when the shaft is positioned in the assembly and the groove 118 being adjacent the opening 31. A shoulder 120 is provided on the outer shaft wall in spaced relation to the groove 116. A second shoulder 122 is provided at the opposite end of the shaft 110 adjacent but in spaced relation to the groove 118.

The bearing 112 is adapted to be longitudinally positioned along the shaft 110 between the shoulder 120 and the groove 116. A snap ring 117 is adapted to be received within the groove 116 to affix the bearing longitudinally of the shaft in position between groove 116 and shoulder 120.

The bearing 114 is longitudinally positioned on the shaft 110 between the shoulder 122 and the groove 118. A snap ring 119 is received within the groove 118 to affix the bearing on the shaft between the groove 118 and the shoulder 122.

The shaft 110 is provided with a radially extending flange 124. A raised shoulder portion 126 is provided on the outer shaft wall integral with the flange 124. A bevel gear 128 is adapted to be snugly slidably received over the shoulder portion 126 of the shaft 110, said bevel gear being rigidly affixed to said shaft by a plurality of bolts 130 which extend through the flange 124 and into the bevel gear.

The bevel gear in the assembled power transfer mechanism is disposed within the chamber 32 of the housing. The gear 128 in the assembled mechanism is disposed within the chamber 36 of the housing as illustrated in FIGURE 3.

The shaft 110 extends from the central opening 31 of the plate 30, through the chamber 36 of the housing 18, through the opening 29 in plate 28 and into the central chamber 34. The inner terminal portion of the shaft 110, that is the portion extending within the central chamber 34 of the housing, is provided with a splined portion 113.

A spur gear 134 is non-rotatably received on the splined portion 101 of the shaft 86, said spur gear 134 being disposed wholly within the central chamber 34 of the housing 18. A spur gear 136 is received on the splined portion 113 of the shaft 110. The gear 136 is non-rotatably mounted on the shaft 110 by the interengaging splined portions of the shaft and gear. The inner faces 135 and 137 of the gears 134 and 136, respectively, are disposed in face-to-face spaced relation, as indicated in FIGURE 3.

A mounting plate 138 is disposed in telescoped relation over the shaft 86 adjacent the rear face of the spur gear 134 of the power transfer device. The mounting plate 138 is provided with a plurality of openings 140 therein at spaced intervals thereabout. A second mounting plate 142 is telescopically received about the inner terminal of the shaft 110 of the power transfer device. The plate 142 is provided with a plurality of openings therein at spaced intervals thereabout. Plate 142 is provided with a central opening therein of larger diameter than the outside diameter of the hub portion 136' of the gear 136, said plate 142 being longitudinally positioned on the shaft 110 adjacent the rear face of the spur gear 136.

A cage member 146 is disposed within the space defined between the faces 135 and 137 of the spur gears 134 and 136, respectively. The side walls 146' and 146" of the cage member 146 are in relative spaced relation to the adjacent faces of the spaced spur gear members of the power transfer device. The cage member 146 defines a plurality of recesses 150 at spaced intervals about the outer periphery thereof, said recesses extending inwardly of the cage member. The upstanding radially extending flanges 152 defined by the boundaries of the recessed portions of the caged member 146 are each provided with a threaded opening 154 therein.

Figure 2:
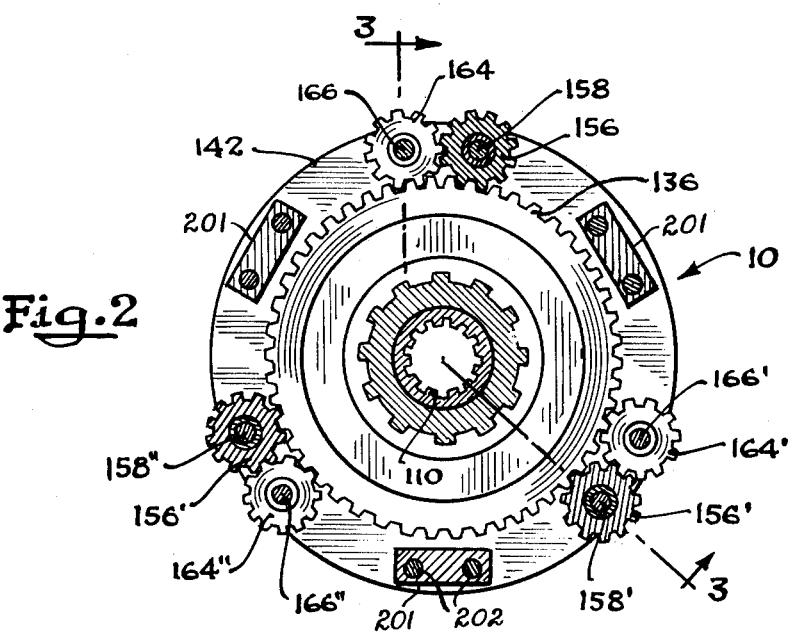
FIGURE 2 is an elevation view, partly in section, taken along lines 2—2 of FIGURE 1.

As shown in FIGS. 1 and 2, a series of spacer blocks 200 are provided between the mounting plate 138 and the sidewall 146' of the case member 146. A second series of spacer blocks 201 are provided between the second mounting plate 142 and the side wall 146" of the case member 146. The entire assembly of mounting plates 138 and 142, spacer blocks 200 and 201, and cage member 146 is fastened together by a plurality of bolts 202.

A series of paired pinion gears 156, 156', 156" and 164, 164', 164" are provided at spaced intervals about the periphery of the caged member, as illustrated in FIGURES 1, 2 and 3 of the drawings. Pinion gear 156 is rotatably mounted on the shaft 158 by a suitable bearing member 160, the pinion 156 thereby being free to rotate on said shaft. The pinion gear 156 is in meshing engagement with the spur gear 134 of the power transfer device 10. One end of the shaft 158 is supported in the opening 140 of the mounting plate 138. The other end of the shaft is threadably received in the opening 154 in the flange 152 of the caged member 146. The mounting plate 138 thus is supported through the shaft 158 and the pinion 156 in coaxial relation with the shaft 86.

Pinion 156' is rotatably supported on shaft 158' by bearing 160'. One end of the shaft 158' is supported in the opening 140 of the mounting plate 138, the other end of the shaft being threadably received in the opening 154 of the cage member 146. A third pinion 156" is supported in the same manner as defined hereinabove for pinions 156 and 156'. Each of the pinions noted hereinabove is in meshing engagement with the toothed periphery of the spur gear 134.

Three pinion gears 164, 164' and 164" are rotatably supported on shafts 166 by bearing members 168. One end of each shaft 166 is supported in openings 141 in the mounting plate 142. The other end of each of the shafts 166 is threadably received and supported in the openings 154 of the upstanding radially extending flange of the cage member 146. Each of the pinion gears 154 is in meshing engagement with the toothed outer periphery of the spur gear 136.

The mating pairs of pinions 156 and 164 are in meshing engagement with each other and with their respective spur gears, as noted hereinabove. The mounting plate 142 thus is coaxially supported with respect to the shaft 110 in the same manner as the support of plate 138, that is, through the shafts 166 and the pinions 164 of the power transfer device.

The cage member 146 defines a serrated central opening 170 therein. A mating toothed member 172 is received in the serrated central opening 170 of the cage member 146 in mating interengaging relation therewith so as to be nonrotatably mounted with respect to said cage member. An output shaft 174 integral with and extending from the member 172 extends along the central opening 87 of the shaft 86, said output shaft being coaxially mounted with respect to said shaft 86. It can readily be seen that the output shaft 174 may extend along the central opening 87 of shaft 86 or along the central opening 111 of shaft 110 depending upon which direction the power takeoff must be mounted. The transfer device is symmetrical in that respect.

The power transfer device of the present invention may be driven by either or both of the input power sources (not shown) with smooth transition being available upon transition from one driving source to the other.

In driving from the power source associated with the input shaft 12 the power delivery chain is defined through the shaft 12, to the spur gear 46, gear 50 and to the bevel pinion 58. The bevel pinion 58 rotates the bevel gear 106 which gear 106 is rigidly mounted to the flange 102 of the shaft 86. Thus, rotation of the gear 106 will direct rotation of the shaft 86. The spur gear 134 is non-rotatably mounted with respect to the shaft 86 by engagement therewith along the splined portion 101 of said shaft. Rotation of the shaft 86 will cause the spur gear 134 to rotate in the same direction at a rotational velocity with respect to the power sources which is proportional to the gear ratios established between the shaft extending from the power source and the spur gear 134. Rotation of the spur gear 134 will direct rotation of the pinions 156, 156' and 156" due to meshing engagement of said 156 series pinions with said spur gear.

With power being supplied from one power source, through the shaft 12 in the example above, the pinions 156, 156' and 156" will, through meshing engagement thereof with the mating pinions 164, 164' and 164", cause the mating pinions (164 series) to "walk" about the braked spur gear 136. It can readily be seen that the 164 series pinion gears are fixed with respect to the 156 pinion series and with respect to the cage member 146. Rotation of the 164 series pinions in this manner will necessarily direct rotation of the cage member 146 in the same angular direction. The 164 series pinions also are rotated about their respective shaft due to engagement thereof with the mating 156 series pinions. The 164 series pinions, however, are free to "walk" or rotate about the spur gear 136 without imparting movement to the gear 136. The "walking" of the 164 series pinions with power delivered from one source is requisite to rotation of the cage member 146 and therethrough of the output shaft 174.

With power bieng delivered from the power source (not shown) operatively associated with the shaft 14, the power chain is defined through shaft 14, gear 72, gear 76 to bevel pinion 84. The pinion 84 drives the bevel gear 128 which gear 128 is rigidly affixed to the flange 124 of the shaft 110. Rotation of the bevel gear 128 drives the shaft 110 and thereby the spur gear 136 which is non-rotatably rigidly affixed to the inner terminal, spline portion of the shaft 110.

Rotation of the spur gear 136 directs rotation of the pinion gears 164, 164' and 164" through the meshing engagement therebetween. The 164 series pinion gears are meshingly engaged with the 156 series pinion gears. In order for the 164 series pinion gears to rotate the mating 156 series pinion must also rotate in unison with said 164 series gears. The spur gear 134 is braked against angular movement through the power chain defined therefor and the power input source associated therewith. Thus, rotation of the 156 series pinions will cause them to "walk" about the toothed periphery of the spur gear 134 thereby to impart angular movement to the cage member 146 and therethrough to the output shaft 174.

Thus, it is seen that power may be delivered from either power input source to the output shaft through the power transfer device of the present invention with the second power input source fully braked rotation of the cage member of the power transfer device derived through walking of one of the mating series of pinions about the mating braked spur gear associated with the braked, idle power input source.

Transfer from one power input source to the other during continuation of operation of the apparatus may be realized by braking of the power source to be idled with respect to the differential while at the same time bring the alternate driving source into driving engagement with the differential through the power chain defined therefor.

Modification of the gear ratios by changing of gears with the present power transfer apparatus may readily be accomplished. The gears 134 or 136 may be changed to effect a change in driving ratios between the two gears with respect to the caged member 146. A larger diameter gear in the place of gear 136, for example, would modify the driving ratios between gear 134 and the larger gear and the caged member 146, with respect to those ratios realized with the apparatus as illustrated. Insertion of a larger diameter gear, of course, would necessitate rotation of the 164 series pinions upwardly to engagement with the toothed outer periphery of said larger gear. The pinions would be moved upwardly with respect to the 156 series pinions to move the 164 pinions into engagement with both the larger gear and the 156 series pinions.

While I have shown and described a specific embodiment of the present invention it will, of course, be understood that other modifications and alternative constructions may be used without departing from the true spirit and scope of this invention. I therefore intend by the appended claims to cover all such modifications and alternative constructions as fall within their true spirit and scope.

What I claim as new and desire to secure by Letters Patent of the United States is:

1. A power transfer device adapted to transfer power alternately from one of two input power sources to an output shaft, said transfer device comprising:
    a pair of axially aligned input shafts at least one of said shafts defining an open central portion extending into said shaft, each of said input shafts being interconnected, respectively, to one of said input power sources, and an output shaft disposed within the open central portion of said one of said input shafts;
    a spur gear affixed to one end, respectively of each shaft of said pair of input shafts, said spur gears when assembled on the ends of said shafts being in face-to-face relation and defining a space therebetween;
    a pair of gear mounting plates each of which is telescopically received about one of said input shafts;
    a caged member mounted on one end of the output shaft, said caged member being operatively disposed within the space defined between said face-to-face spaced spur gears, said caged member having a plurality of radially extending flanges thereon; and
    a plurality of pinion gears meshingly engaged with each of said spur gears, respectively, each of said pinion gears being rotatably mounted on a shaft, one end of each of said shafts being mounted in one of said mounting plates, the other end of each of said shafts being mounted in the radially extending flange of said cage member, said pinion gears engaging one of said spur gears being mutually meshingly interengaged with the pinion gears engaging the other of said spur gears.

2. A power transfer device adapted to transfer power alternately from one of two power sources to an output shaft, said power transfer device comprising:
    a pair of input shafts, each of said shafts being interconnected, respectively, to one of said input power sources, and an output shaft, each of said shafts being mounted in parallel axial relation to each other;
    a spur gear affixed to one end, respectively, of each shaft of said pair of input shafts, said spur gears when assembled on the ends of said shafts being in face-to-face spaced relation;
    a pair of gear mounting plates each of which is telescopically received about one of said input shafts;
    a caged member mounted on one end of said output shaft in the face-to-face space defined between said spur gears, said caged member defining a plurality of recesses adjacent the outer periphery thereof, each of said recesses having a radially extending flange along at least one margin thereof; and,
    a pair of pinion gears one adapted to be received in each of the recesses of the caged member, one of said pinion gears meshingly engaged with each of said spur gears, each of said pinion gears being rotatably mounted on a shaft, one end of each of said shafts being mounted in one of said gear mounting plates, the other end of each of said shafts being mounted in the radially extending flange defined on said caged member, said pinion gears being mutually meshingly interengaged.

3. A power transfer device adapted to transfer power alternately from one of two power sources to an output shaft, said power transfer device comprising:
    first and second input shafts, each of said shafts being operatively interconnected, respectively, to one of said two power sources, said first shaft defining a central opening extending therealong, and an output shaft coaxially disposed within the central opening defined in said first input shaft;
    a spur gear non-rotatably affixed to one end, respectively, of each of said input shafts, said spur gears, when assembled on the ends of said first and second shafts, being in face-to-face spaced relation;
    a pair of mounting plates each of which is adapted to be received about one of said input shafts;
    a caged member mounted on one end of said output shaft in the face-to-face space defined between said spur gears, said caged member having a plurality of radially extended flanges defined thereon; and,
    a plurality of pinion spur gears meshingly engaged with each of said spur gears, each of said pinion spur gears being rotatably mounted on a shaft, one end of each of said shafts being mounted in one of said mounting plates, the other end of each of said shafts being mounted in the radially extending flange of said caged member, each of said pinion spur gears engaging one of said spur gears being mutually meshingly interengaged with a corresponding pinion spur gear engaging the other of said spur gears.

4. A power transfer device adapted to transfer power alternately from one of two power sources to an output shaft, said power transfer device comprising:
    a pair of axially aligned input shafts at least one of said shafts defining an open central portion extending into said shaft, each of said input shafts being interconnected, respectively, to one of said input power sources, and an output shaft disposed within the open central portion of said one of said input shafts;
    a spur gear affixed to one end, respectively, of each shaft of said pair of input shafts, said spur gears when assembled on the ends of said shafts being in face-to-face spaced relation;
    a pair of gear mounting plates each of which is freely telescopically received about one of said input shafts immediately adjacent the spur gear on each of said shafts;
    a caged member mounted on one end of the output shaft, said caged member being operatively disposed within the space defined between the spur gears, said caged member having a plurality of recesses defined in the outer envelope of said member at radially evenly spaced intervals thereabout;
    a plurality of pairs of pinion gears each pair being adapted to be received within one of said recesses, said pair of gears disposed in mutually meshing interengagement within each of said recesses, one of each of said pair of pinion gears adapted to be in meshing engagement with one of said spur gears and the other of each of said pair of pinion gears adapted to be in meshing engagement with the other of said spur gears, each of said pinion gears being rotatably received on a shaft, one end of each of said shafts being mounted in one of said gear mounting plates and the other end of each of said shafts being mounted in the caged member.

5. A power transfer device adapted to transfer power alternately from one of two power sources to an output shaft, said power transfer device comprising:
- a pair of input shafts, each of said input shafts being operatively interconnected, respectively, to one of said two power sources, one of said shafts defining a central opening extending therein, and an output shaft disposed within the central opening defined in said one of said input shafts;
- a spur gear non-rotatably affixed to one end, respectively of each of said input shafts, said spur gears when assembled on the ends of said input shafts being in face-to-face spaced relation;
- a pair of mounting plates each of which is telescopically received about one of said input shafts each of said mounting plates defining a plurality of shaft receiving openings therein;
- a caged member mounted on one end of the output shaft, said caged member being operatively disposed within the space defined between the spur gears, said caged member having a plurality of recesses defined in the outer envelope of said member at radially evenly spaced intervals thereabout, each of said recesses having a radially extending flange along at least one margin thereof; and
- a plurality of pairs of pinion gears each pair being adapted to be received in one of the recesses of the caged member, one of said pinion gears in each pair meshingly engaged with each of said spur gears, each of said pinion gears being rotatably mounted on a shaft, one end of each of said shafts being mounted in the shaft receiving openings of said mounting plate, the other end of each of said shafts being mounted in the radially extending flange defined along the margin of each of said recesses, each of said pair of said pinion gears being mutually meshingly interengaged.

6. An improved differential adapted to transfer power from one of two power sources to power output means, said differential comprising:
- a pair of input shafts each operatively connected to one of said two power sources, respectively, one of said shafts defining a central opening, and an output shaft disposed within the central opening in said one of said input shafts, said output shaft having an inner terminal;
- a spur gear non-rotatably affixed to one end respectively, of each of the input shafts, said spur gears being in face-to-face spaced relation when assembled on the input shafts; the inner terminal of said output shaft being disposed in the space defined between said spur gears;
- shaft mounting means adapted to be received about each of said input shafts adjacent the spur gears thereon;
- a caged member affixed to the inner terminal of said output shaft and operatively disposed within the space defined between said spur gears, said caged member having a plurality of recesses therein at spaced intervals thereabout each of said recesses opening into the outer periphery of said caged member and defining a radially extending flange along at least one margin thereof; and,
- a plurality of pairs of spur pinion gears each pair being adapted to be received in each of the recesses of the caged member, one of each pair of said spur pinions being meshingly engaged with one of said spur gears and the other of each pair of said spur pinions being meshingly engaged with the other spur gear each pinion of said pairs of spur pinions being rotatably mounted on a shaft, each shaft being mounted at one end in said shaft mounting means and at the other end in said radially extending flanges, each pair of said spur pinion gears being mutually meshingly interengaged.

References Cited in the file of this patent

UNITED STATES PATENTS

| | | |
|---|---|---|
| 2,389,161 | McCoy | Nov. 20, 1945 |
| 2,533,610 | Norelius | Dec. 12, 1950 |
| 2,772,580 | Miura et al. | Dec. 4, 1956 |
| 2,969,696 | Fraza | Jan. 31, 1961 |
| 3,028,768 | Bullard | Apr. 10, 1962 |